Dec. 4, 1951 A. DI GIACOMO 2,577,005
METHOD OF MAKING MOLDED CONDENSERS
Filed March 4, 1948
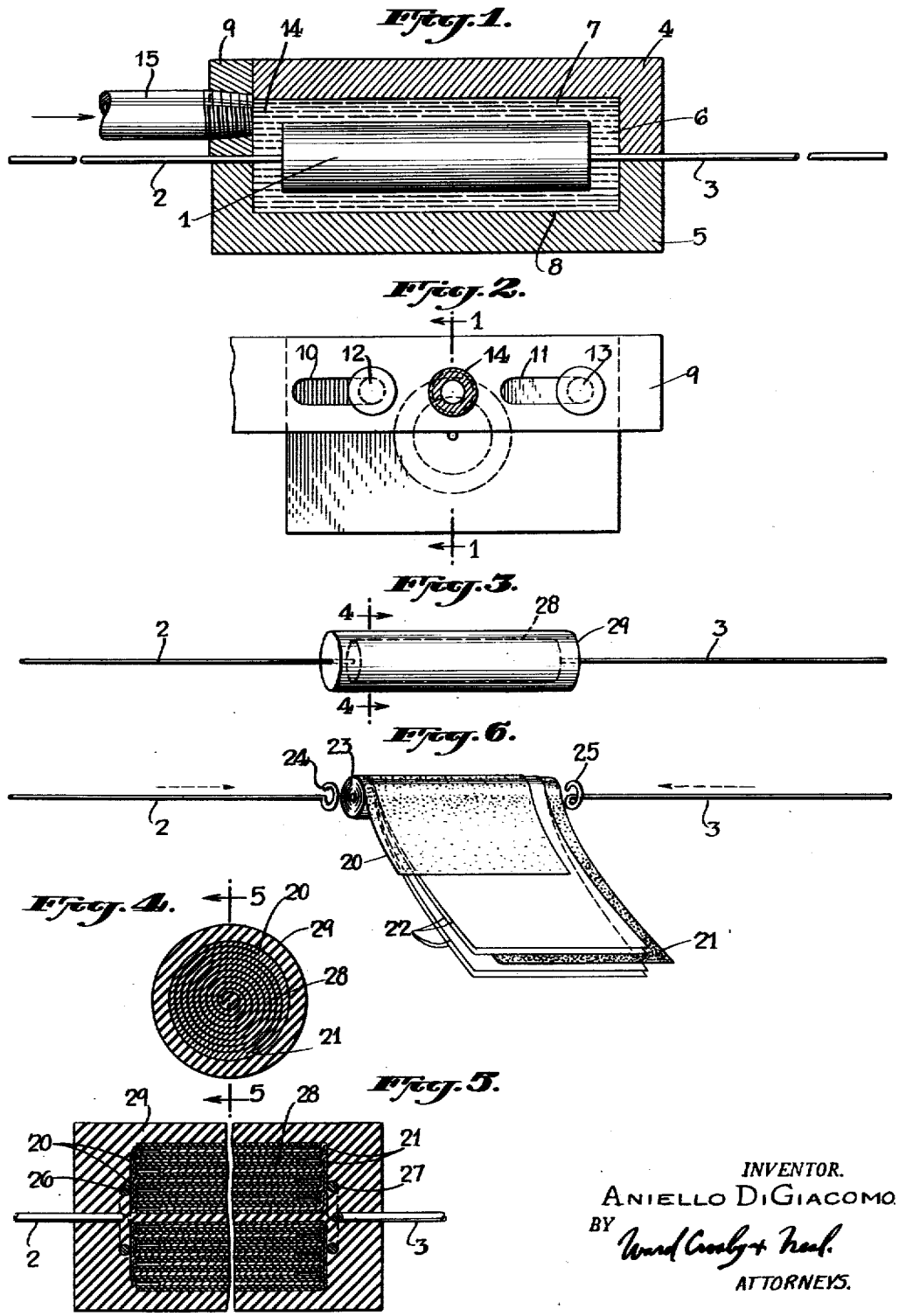
INVENTOR.
ANIELLO DI GIACOMO
BY
ATTORNEYS.

Patented Dec. 4, 1951

2,577,005

UNITED STATES PATENT OFFICE 2,577,005

METHOD OF MAKING MOLDED CONDENSERS

Aniello Di Giacomo, New York, N. Y., assignor to Micamold Radio Corporation, Brooklyn, N. Y., a corporation of New York Application March 4, 1948, Serial No. 12,992

5 Claims. (Cl. 18—59)

1

This invention pertains to improvements in molded electrical condensers, i. e., those wherein a condenser unit is encased and sealed in an outer shell of a substantially impervious insulating material molded thereabout, such for example as a synthetic resin. The invention also pertains to improved methods of molding such condensers.

In molded condensers as heretofore conventionally produced, the condenser unit per se, which may take the form of a roll or stack of alternating conducting and dielectric sheets, is encased in a molded outer shell of a thermoset phenolic type resin, such as a phenol-formaldehyde or phenol-aniline-formaldehyde condensation product. For molding purposes, these resins are ordinarily combined with various fillers, such for example as mica flour, wood flour, etc., and are moldable only under high pressures ranging from about 300 to 8000 pounds per square inch (p. s. i.), and at relatively high temperatures of the order of 275 to 350° F. Resinous molding materials of this type are difficult to work with, due largely to the high pressures, in conjunction with high temperatures, required for molding and consolidating such resinous materials into an integral shell, and for curing the resin from the thermosetting to the thermoset condition. The high pressures thus required have various undesirable effects on the electrical characteristics of condensers molded thereby. For example, the excessive pressure causes the capacitor element to become distorted, and introduces a considerable change in the capacitance and fracture of the dielectric material, the latter causing a lowering of the breakdown voltage, which in turn necessitates a lowering of the capacitor operating voltage. The deleterious end products evolved by the molding compound produce a decrease in insulation resistance, particularly when molding capacitors of the paper dielectric and halowax impregnated types. As a result of these various effects, the useful life of the condenser is greatly shortened.

Due to the characteristics of phenolic resin molding compositions, it is common practice, in the molding of condensers therewith, to preform the same from molding powders into so-called "pills" or "briquettes" of hollow, semi-cylindrical form. A condenser unit is interposed between a pair of these pills and subjected to a compression molding operation, at temperatures and pressures of the order aforesaid for purposes of forming a thermoset resinous shell thereabout. It is also common practice in such molding pro-

2 cedure to preform the pills or briquettes with an excess amount of molding material over and above that required to encase the capacitor element. This excess material, after the molding operation, shows up as fins along the mold seam, or, as it is commonly called, a "flash," which in part adheres to the enclosed capacitor and in part extrudes itself around the wire leads projecting from the capacitor terminals through the encasing resinous shell. This is objectionable due to the relatively high cost involved in removing this excess resinous material from the encased capacitor and the wire leads. Another factor increasing the cost of this molding operation is the necessity of preforming the molding powders into briquettes as aforesaid, and the manual operations involved in assembling a pair of the briquettes and the capacitor in a mold in the manner above explained, i. e., with the capacitor interposed between the briquettes. Still another factor increasing the cost of this molding operation is the time required in the mold for curing phenolic molding compositions of this character, which varies, depending on the particular phenolic composition employed, from about 4 to 8 minutes. The expense entailed by this relatively long molding period will be appreciated from the high cost of the molds and presses which are thus tied up by relatively low production rates, these molds and presses costing many thousands of dollars.

In accordance with the present invention, it is proposed to entirely eliminate the above noted objections involved in the molding of capacitors by prior procedures employing phenolic resins as aforesaid, by resort to a low pressure, injection molding technique, employing for this purpose novel resinous compositions, which are flowable and hence injection moldable at room temperatures and at low pressures, and which moreover will thermoset into a solid state in a matter of but a few seconds, when subjected to relatively low molding temperatures and pressures. The molding compositions for the present invention comprise polymerizable substances selected from the group consisting of the vinyl and polyester compounds and polymers thereof, in admixture with a suitable catalyst, such as hydrogen peroxide or an organic peroxide, and also in admixture wih suitable fillers, such for example as powdered glass, mica, asbestos, crystalline silica, talc, calcium silicate, etc., and pigments, such as barium sulfate, titanium or zirconium oxide, etc. Preferably, the polymerizable substance or substances present will comprise about 65 to 80% by weight of the entire composition, the catalyst about 0.5 to 3% by weight thereof, and the balance substantially fillers of the character aforesaid.

I preferably employ polymerizable compositions of the type described which are selected to have viscosities ranging from about 300 to 2000 centipoises at substantially room temperature, more specifically at 25° C., i. e., 77° F. Such compositions are sufficiently liquid or flowable at room temperatures to be injected at low pressures, for example, 10 to 300 p. s. i., into a moderately heated mold containing the condenser unit, for example, a mold heated to about 200 to 275° F. I find that such compositions when so molded will polymerize and solidify by thermosetting about the condenser unit in exceedingly short periods of time, ranging for example from about 20 seconds to 3 minutes, although ordinarily the setting time will be close to the lower limit specified.

In the molding of condensers in accordance with this procedure, the condenser unit is supported by its terminal leads on the lower half of a heated injection mold, and in spaced relation to the inner walls thereof, the mold being thereupon closed and the polymerizable composition injected therein through a suitable small orifice in the mold wall, the injection being continued until the mold cavity is completely filled. Thereupon, the injection orifice is closed for a sufficient interval to permit the molding composition to thermoset into a sealed shell completely encasing the condenser unit. This, as stated, ordinarily requires a matter of but a relatively few seconds, for example, 20 seconds or so.

As stated, the molding composition is injected into the mold at relatively low pressures, ranging from about 10 to 300 p. s. i., and preferably at about 30 p. s. i., the rate of injection being so adjusted as to maintain the pressure on the condenser unit per se at an extremely low value, ordinarily not in excess of about 25 p. s. i., and preferably well below this value. It will be understood in this connection that, in consequence of the injection molding procedure, and the frictional losses involved therein, that the pressure of the molding composition on the condenser unit will be considerably below the pressure at which the molding composition is injected, this being determined by such factors as the diameter and length of the molding orifice, rate of injection, etc.

In speaking of the pressure applied to the condenser unit per se, I have particular reference to the pressure applied to the condenser unit of the completed and molded product, as determined by the following test:

A condenser unit which is a substantial duplicate of the construction to be molded is calibrated as to its capacity under various mechanical or hydrostatic pressures, and then the completed product, which has been molded in accordance with the present invention, is measured as to capacity, and the corresponding pressure on the condenser unit of the completed product is taken to be the pressure which has been determined by the calibration above mentioned, to correspond to that capacity. It will be noted that the pressure as thus determined will be that which is exerted on the condenser unit in the completed, molded product, which pressure may include components due not only to the injection pressure but due also to solidification of the molding composition thereabout. But since the novel molding compositions of the present invention will not contract materially upon setting, the pressure values as above determined will in general correspond closely to the actual molding pressures. Using conducting and dielectric sheets of the character commonly employed in condensers of the molded type, it has been found that capacity changes amount to 25% or more in molding condensers in accordance with the prior procedure above referred to, as against variations of less than 10% with the molding procedure of the present invention.

Under relative life tests, it has been found that molded condensers made in accordance with the present invention will stand up for 1000 hours at 150% of their rated voltage without failure; whereas corresponding condenser units molded in accordance with the prior procedures above mentioned, will exhibit failures after the first hundred hours of life tests. Also, with the present invention, the insulation resistance of the condensers is retained over long periods of shelf life, exhibiting drops of not more than 10% in 1000 hours, as against drops of approximately 50% in similar tests conducted on condensers molded in accordance with the prior procedure above mentioned. Also, an important advantage of the present invention resides in the short time at low pressure required in the mold for polmerizing the molding composition to the solid thermoset state, ordinarily of the order of 20 seconds at 25 p. s. i., as against molding times of 4 to 8 minutes at high pressures of 1000 or so p. s. i., required in molding condensers with phenolic resins as above referred to.

The polymerizable substances employed in the molding compositions of the present invention are, as above stated, polymerizable vinyl and polyester compounds and polymers thereof, such for example as styrene monomer, diallyl phthalate, vinyl acetate, cyclopentadiene, ethylene glycol maleate, or admixtures thereof, such as styrene monomer with diallyl phthalate, or methyl methacrylate polymerized to a viscosity of 400 centipoises with divinyl benzene or vinyl acetate with diallyl phthalate, the latter polymerized to a viscosity of about 500 centipoises, etc.

The catalyst employed will ordinarily be of an oxidizing nature, preferably hydrogen peroxide or an organic peroxide, such as benzoyl, caproyl, acetyl peroxide, or tertiary butyl hydroperoxide, etc. I prefer, however, to use a paste catalyst consisting, for example, of 50% benzoyl peroxide extended with tricresyl phosphate. The use of an extender is not necessary but is preferred to facilitate the dispersion of the catalyst throughout the resin, and, as above stated, the catalyst will ordinarily be present in amount ranging from about 0.5 to 3% by weight of the molding composition.

The filler employed may be diatomaceous earth, amorphous or crystalline silica, talc, calcium silicate, barium sulfate, titanium dioxide, zirconium oxide, asbestos, powdered glass, powdered mica or the like, but I prefer to employ silica in one of the forms above mentioned, the same being inert, of low water content, and with little or no objectionable impurities, as well as low in cost. The filler may be present in amounts ranging from about 10 to 80% by weight of the molding composition.

The following are given as specific examples of molding compositions appropriate for the practice of the present invention.

Example I

| | Grams |
|---|---|
| Styrene monomer | 20 |
| Diallyl phthalate | 80 |
| Benzoyl peroxide | 1 |
| Powdered crystalline silica | 220 |

Example II

| | Grams |
|---|---|
| Methyl methacrylate polymerized to a viscosity of 400 centipoises | 100 |
| Divinyl benzene | 5 |
| Tertiary butyl hydroperoxide | 3 |
| Titanium dioxide | 275 |

Example III

| | Grams |
|---|---|
| Vinyl acetate | 30 |
| Diallyl phthalate polymerized to a viscosity of 500 centipoises | 70 |
| Ammonium persulphate | 1 |
| Chrome yellow | 175 |

Example IV

| | Grams |
|---|---|
| Cyclopentadiene | 30 |
| Ethylene glycol maleate | 70 |
| Hydrogen peroxide 30% | 1 |
| Calcium silicate | 200 |

In compounding the above compositions, the catalyst is thoroughly mixed with the resin ingredients, after which the filler is added, and the entire mix placed under vacuum for a short time to draw out the air bubbles. The working life of the molding compositions will be at least one hour at room temperature and, as previously stated, they may be injected cold into a mold cavity at pressures varying from 10 up to 300 p. s. i.

The mold is heated to a temperature of 200 to 275° F., and preferably 225 to 250° F. The condenser unit being placed in the mold cavity, the upper section of the mold is placed in operative position under a pressure of about 30 p. s. i.

In the accompanying drawing:

Fig. 1 is a vertical longitudinal section taken at 1—1 of Fig. 2, showing diagrammatically a form of mold adapted to be used in practicing the present invention; while Fig. 2 is an end elevation of the mold, illustrating the slidable upper wall for opening and closing the injection orifice.

Fig. 3 is a perspective view of a molded condenser produced in accordance with the invention; Fig. 4 being a transverse section thereof taken at 4—4 of Fig. 3; while Fig. 5 is an axial section thereof taken at 5—5 of Fig. 4.

Fig. 6 is an exploded perspective view, illustrative of the method of manufacturing the condenser unit per se.

Referring to Figs. 1 and 2, there is shown a three-part mold adapted for use in molding a condenser unit 1, having terminal conductors 2, 3 extending from its opposite ends. As shown in Fig. 1, the terminals 2, 3 support the condenser unit 1 between the upper and lower sections 4, 5 respectively of the mold, and within the molding cavity 6, in spaced relation to the inner walls 7, 8 thereof. One end wall 9 of the upper mold section 4 is, as illustrated in Fig. 2, transversely slidable with respect to portion 4, being horizontally slotted as at 10, 11, and slidably secured to portion 4 by means of bolts 12, 13 threaded into portion 4. The slidable end portion 9 is provided with one or more bead openings, such as 14, through which the molding composition may be injected into the mold cavity 6 through an appropriate nozzle, such as 15, adapted threadedly to engage the opening 14, as illustrated in Fig. 1, the mold being heated, as above described, by any appropriate conventional heating means, not shown for simplicity in illustration. When the end portion 9 is slid to the position shown in Fig. 2, the orifice 14 therein registers with the mold cavity 6, but when slid furthest to the right, as determined by the slots 10, 11 abutting bolts 12, 13, the mold cavity 14 will register with the metal wall of the upper mold section 4. The molding composition is injected through the nozzle 15, under a fluid pressure of about 10 to 300 p. s. i., and preferably about 50 p. s. i., from a suitable conventional source, likewise not illustrated for simplicity. After the appropriate measured amount of the molding composition has been injected, the pressure is released and the slide 9, along with the nozzle 15 threaded therein, is moved to the limiting position of adjustment to the right, in Fig. 2, out of line with the molding cavity 6, to prevent the outflow of the molding composition from the molding cavity.

As previously stated, the molding composition will set within about 20 seconds, following which the mold may be opened and the completed molded condenser unit of Fig. 3 ejected by appropriate means. The pressure impressed on the condenser unit during and upon completion of the molding operation need not exceed 25 p. s. i. There will be no resulting distortion or weakening of the laminae of the condenser, and the breakdown voltage of the latter will be substantially higher than with the use of prior conventional condenser molding procedures previously referred to. As previously stated, the resulting variation in capacity of the condenser unit may be held within 10%, and with a marked increase in life.

Referring now to Figs. 3 to 6, inc., the condenser unit per se may be made up of conductive strips, such as 20, 21, of metal foil or the like, alternating with strips, such as 22, of a suitable dielectric material, for example, paper. The metal strips 20, 21 are slightly staggered in opposite directions, as shown, with respect to the insulating strips 22, in order to provide convenient terminals for the condenser unit, as explained below. The resulting strip assembly 20 to 22 inc. is formed into a roll, in the manner illustrated at 23, Fig. 6, and thereupon the condenser wire leads 2, 3, which terminate in loops 24, 25 adjacent the condenser unit, are soldered to the rolled-up ends of the conductive sheets 20, 21, as illustrated at 26, 27 of Fig. 5.

The condenser unit, as thus assembled and as prevented from unrolling, for example, by taping up with a strip of cellophane or the like, is now in condition for placing in the mold, as illustrated by the numeral 1 of Fig. 1. Following the molding operation, the condenser will have the appearance illustrated in perspective in Fig. 3, and in transverse and axial section in Figs. 4 and 5 respectively, the condenser unit per se being shown at 28, while the molded resinous shell encasing the same is shown at 29.

While the invention has thus been disclosed as practiced by the specific procedure and apparatus above noted, it should be understood that changes may be made therein without departing from the invention in its broader aspects, and within the scope of the appended claims. Thus, for example, the invention may be applied to the molding of paper dielectric condensers of the type illustrated in the drawings, as well as to electrolytic condensers, to condensers of the mica dielectric or ceramic dielectric types, etc.

What I claim is:

1. The method of making a molded electrical condenser, consisting of a condenser unit, encased in a thermoset resinous shell, which comprises: supporting said condenser in a heated injection mold and in spaced relation to the inner walls thereof; injecting into said mold, at a pressure below 300 pounds per square inch, a polymerizable and thermosetting molding composition which is flowable at room temperature and which comprises a vinyl compound and at least one substance selected from the group consisting of unsaturated esters and polymers thereof, in an admixture with a catalyst and an inert filler; continuing said injection until said mold is substantially filled and the condenser wholly encased in said composition; thereafter maintaining said mold at an elevated temperature and for a period sufficient to convert said molding composition into a solid and thermoset state, said molding position being subjected to a pressure less than 300 pounds per square inch during all of the aforementioned steps, and thereupon removing the so encased condenser from said mold.

2. A method of making a molded electrical condenser, consisting of a condenser unit, encased in a thermoset resinous shell, said condenser having terminal conductors projecting through said shell, and said method comprising: supporting said condenser by means of its terminal conductors in a heated injection mold and in spaced relation to the inner walls thereof; injecting into said mold, a polymerizable and thermosetting molding composition which is flowable at room temperature and which comprises a vinyl compound and at least one member selected from the group consisting of unsaturated esters and liquid polymers thereof in admixture with a catalyst and an inert filler; so regulating the rate of injection of said composition as to maintain a relatively low pressure on said condenser, substantially below 300 pounds per square inch, and continuing said injection until said condenser is wholly encased in said composition; thereafter maintaining said mold at an elevated temperature and for a period sufficient to convert said composition into a solid and thermoset state, said molding composition being subjected to a pressure less than 300 pounds per square inch during all of the aforementioned steps; and thereupon removing the so encased condenser from said mold.

3. A method of making a molded electrical condenser, consisting of a condenser unit encased in a thermoset resinous shell, said condenser having terminal conductors projecting through said shell, and said method employing a heated injection mold comprising upper and lower halves and having an injection orifice, said method comprising: supporting said condenser by means of its terminal conductors between the halves of said mold and in spaced relation to the inner walls thereof; injecting into said mold, a polymerizable and thermosetting molding composition which is flowable at room temperature and which contains a vinyl compound and at least one member selected from the group consisting of unsaturated esters and polymers thereof in admixture with a catalyst and an inert filler, so regulating the rate and pressure of said injection of said composition as to maintain a relatively low pressure on said condenser, substantially below 300 pounds per square inch, and continuing said injection until said condenser is wholly encased in said composition; thereafter maintaining said mold at an elevated temperature and for a period sufficient to convert said molding composition into a solid and thermoset state, said molding composition being subjected to a pressure less than 300 pounds per square inch during all of the aforementioned steps, and thereupon removing the so encased condenser from the mold.

4. A method of making a molded electrical condenser, consisting of a condser unit, encased in a thermoset resinous shell, said condenser having terminal conductors projecting through said shell and said method employing a heated injection mold comprising upper and lower halves and having an injection orifice together with means for closing the same substantially flush with the inner surface of the mold cavity for eliminating sprues, said method comprising: supporting said condenser by means of its terminal conductors between the halves of said mold and in spaced relation to the inner walls thereof; injecting into said mold a polymerizable molding composition having a room temperature viscosity of about 300 to 2000 centipoises, and which comprises a vinyl compound and at least one member selected from the group consisting of unsaturated esters and polymers thereof, in admixture with a catalyst and an inert filler; so regulating the rate of said injection as to maintain a relatively low pressure on said condenser, of the order of 10 to under 300 pounds per square inch; and continuing said injection until said condenser unit is wholly encased in said composition, and the mold cavity substantially filled; thereupon closing said mold orifice, and thereafter maintaining the mold at an elevated temperature and for a period sufficient to convert said composition into a solid, thermoset state, said molding composition being subjected to a pressure less than 300 pounds per square inch during all of the aforementioned steps; and thereupon removing the so encased condenser from said mold.

5. The method of making a molded electrical condenser, consisting of a condenser unit, encased in a thermoset resinous shell, said condenser having terminal conductors projecting through said shell from opposite sides thereof, and said method employing a heated injection mold comprising upper and lower halves and containing an injection orifice together with means for closing the same substantially flush with the inner surface of the mold cavity, for eliminating sprues, said method comprising: supporting said condenser by means of its terminal conductors between the halves of said mold and in spaced relation to the inner walls thereof; injecting into said mold, a polymerizable and thermosetting molding composition having a room temperature viscosity of about 300 to 2000 centipoises, and which consists to the extent of about 65 to 80% of the total weight of said composition, of a vinyl compound and at least one member selected from the group consisting of unsaturated esters and polymers thereof, in admixture with ½ to 3% of an oxidizing catalyst, and the balance substantially inert filler material; so regulating the rate of said injection as to maintain a relatively low pressure on said condenser unit on the order of 10 to 30 pounds per square inch; continuing said injection until said condenser unit is wholly encased in said composition and mold cavity substantially filled therewith; thereupon closing the mold orifice, and thereafter maintaining the mold at a temperature of about 200 to 275° F. for a period of about 1/3 to 3 minutes, and until said composition has been converted to a solid and thermoset state, said molding composition being subjected to a pressure less than 300 pounds per square inch during all of the aforementioned steps; and thereupon removing the so encased condenser from said mold.

ANIELLO DI GIACOMO.

REFERENCES CITED

The following references are of record in the file of this patent:

UNITED STATES PATENTS

| Number | Name | Date |
|---|---|---|
| 1,333,004 | Vaughn | Mar. 9, 1920 |
| 1,455,199 | Groten | May 15, 1923 |
| 1,871,492 | Brennecke | Aug. 16, 1932 |
| 1,873,548 | Cole | Aug. 23, 1932 |
| 1,888,613 | Apple | Nov. 22, 1932 |
| 2,255,313 | Ellis | Sept. 9, 1941 |
| 2,400,892 | Soday | May 28, 1946 |
| 2,407,479 | D'Alelio | Sept. 10, 1946 |
| 2,442,810 | Haas | June 8, 1948 |
| 2,456,381 | Clark | Dec. 14, 1948 |

FOREIGN PATENTS

| Number | Country | Date |
|---|---|---|
| 484,925 | Great Britain | May 12, 1938 |

OTHER REFERENCES

Kropa, Preprint 90–92 of the Electrochemical Society, pp. 351–365, received in Pat. Off. Library December 3, 1946.

Certificate of Correction

Patent No. 2,577,005                                                     December 4, 1951

ANIELLO DI GIACOMO

It is hereby certified that error appears in the printed specification of the above numbered patent requiring correction as follows:

Column 4, line 29, for "polmerizing" read *polymerizing*; column 7, line 25, for "position" read *composition*; column 8, line 14, for "condser" read *condenser*;

and that the said Letters Patent should be read as corrected above, so that the same may conform to the record of the case in the Patent Office.

Signed and sealed this 18th day of March, A. D. 1952.

[SEAL]

THOMAS F. MURPHY,
*Assistant Commissioner of Patents.*